United States Patent [19]

Flajole

[11] 3,738,302

[45] June 12, 1973

[54] CARGO CONTAINER MOUNTING

[76] Inventor: Earl J. Flajole, 1135-B Bonita Drive, Encinitas, Calif.

[22] Filed: Oct. 2, 1970

[21] Appl. No.: 77,430

[52] U.S. Cl............ 114/72, 214/10.5 R, 105/369 R
[51] Int. Cl............................................. B63b 25/00
[58] Field of Search............... 114/72, 73, 83, 75; 214/10.5 R, 10.5 D; 105/366 R, 366 D, 369 BA, 369 R; 193/34, 38; 244/118 R; 248/358 R

[56] References Cited
UNITED STATES PATENTS

| | | | |
|---|---|---|---|
| 3,073,260 | 1/1963 | Dunlap et al................. | 105/369 BA |
| 3,494,486 | 2/1970 | Knight et al. ...................... | 214/15 R |
| 3,552,345 | 1/1971 | Harlander............................ | 114/72 |
| 2,252,938 | 8/1941 | Lord ............................... | 248/358 R |

*Primary Examiner*—Milton Buchler
*Assistant Examiner*—S. D. Basinger
*Attorney*—Richard K. MacNeill

[57] ABSTRACT

A cargo container mounting on a cargo ship having a plurality of vertically cells for the vertical stacking of cargo containers separated by bulkheads in which a plurality of vertical base channels are disposed at the container corner locations; the vertical channels containing a displaceable shock-absorbing strip such as rubber for cushioning the movement of the containers due to the pitch of the ship when underway.

1 Claim, 6 Drawing Figures

INVENTOR.
EARL J. FLAJOLE
BY
Richard K. Macneill

INVENTOR.
EARL J. FLAJOLE

BY

Richard K. Macneill

CARGO CONTAINER MOUNTING

BRIEF DESCRIPTION OF THE INVENTION

The present invention relates to a cargo container mounting and more particularly to a cargo container mounting for cushioning the cargo containers against movement of the vehicle or vessel.

According to the invention, a cargo container mounting is provided in which vertical cells of cargo containers are disposed within the mountings, the mountings having cushioning strips to cushion corner portions of the cargo containers. The cushioning strips are preferably constructed of rubber. While the invention is described with respect to a cargo ship, it is to be understood that it will equally apply to getting freight or cargo-carrying vehicles, such as aircraft or rail transportation.

An object of the present invention is the provision of an improved cargo container mounting.

Another object of the invention is the provision of a cargo container mounting having built-in shock-absorbers.

A further object of the invention is the provision of a cargo container mounting which has a special utility in shipboard use.

Yet another object of the invention is the provision of a cargo container mounting in which loading and unloading is extremely convenient.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein.

DETAILED DESCRIPTION OF THE DRAWINGS

Figure 1:
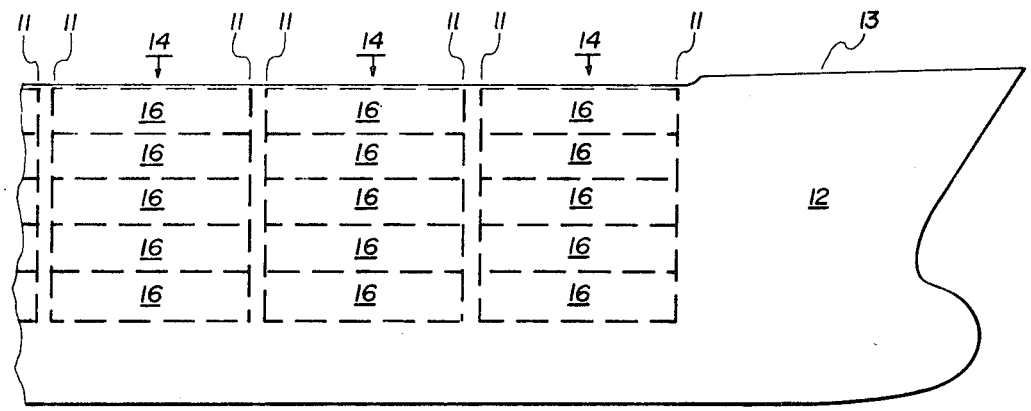
FIG. 1 is a schematic representation of a side elevation of the general layout of the present invention on board a cargo ship.

Referring to FIG. 1, a cargo vessel is shown generally at 12 with the locations of the cargo container mounting shown generally at 11 defining vertical cells of cargo containers 16.

Figure 2:
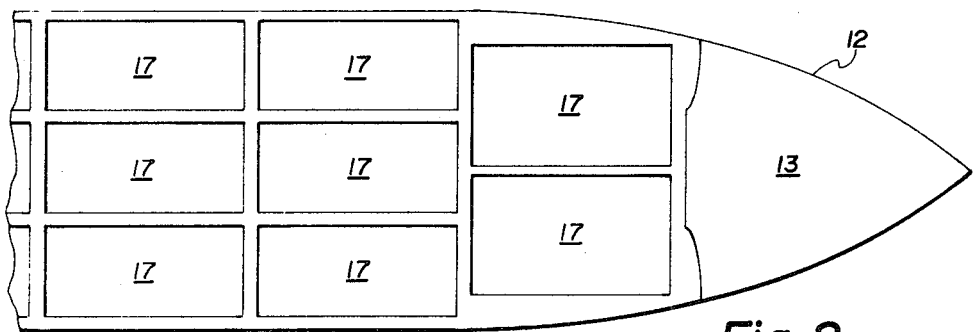
FIG. 2 is a schematic representation of a typical shipboard cargo ship layout.

Referring to FIG. 2, the top view of ship 12 is shown having deck 13 with a plurality of loading hatches 17.

Figure 3:
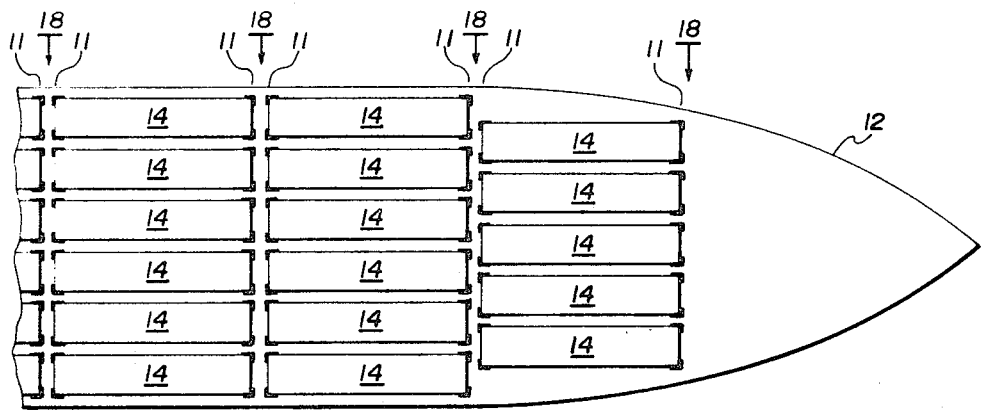
FIG. 3 is a top view of the schematic representation of FIG. 1.

Referring to FIG. 3, the top view of ship 12 is again shown with vertical cells 14 for loading containers therein.

Figure 4:
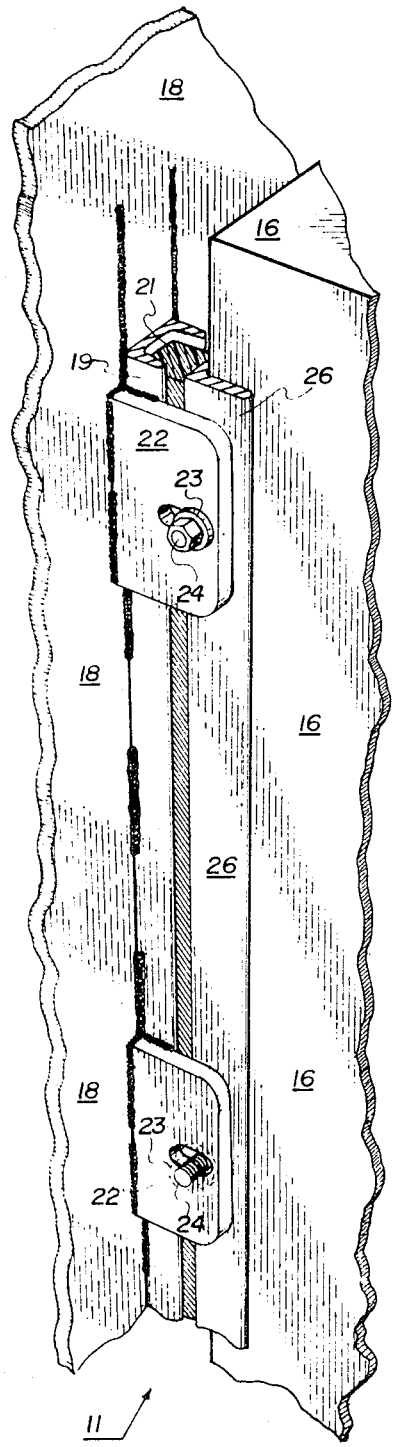
FIG. 4 is an isometric representation of the present invention in situ.

Referring to FIG. 4, a container is shown generally at 16 having a vertical angle track 26 at one corner thereof. One surface of vertical angle track 26 is bolted to slotted plate straps 22 by threaded studs 24 and wide base stud nuts 23. Base channels 19 are vertically disposed against bulkhead 18 and plate straps 22. Base channels 19 carry displaceable shock-absorbing strip 21 therein.

Figure 5:
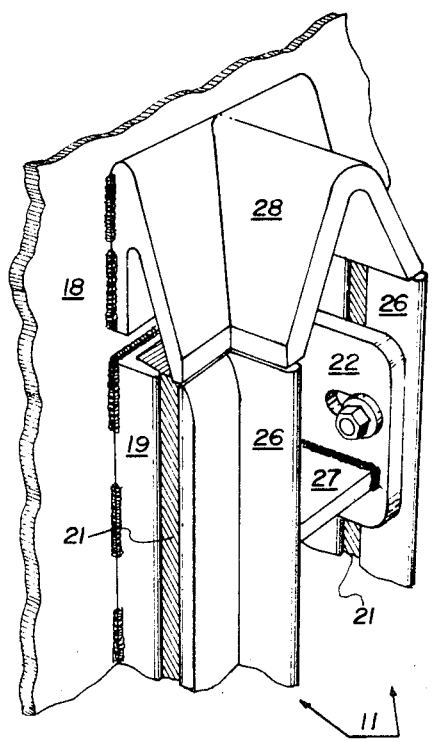
FIG. 5 is an isometric view of the present invention of another portion of the embodiment of FIG. 4.

Referring to FIG. 5, base channel 19 is again shown with displaceable shock-absorbing strip 21 therein. Vertical angle track 26 has an entry wedge 28 on the shock-absorbing side. Guide in casting 28 is welded to bulkhead 18. Slotted plate strap 22 is shown having plate 27 welded thereto for separating adjacent plate straps.

Figure 6:
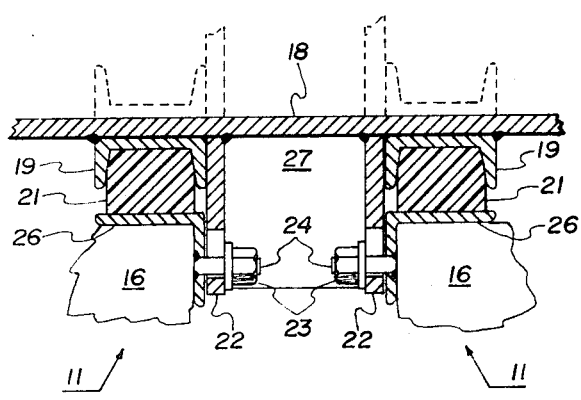
FIG. 6 is a top view of the present invention partially sectioned.

Referring to FIG. 6, bulkhead 18 is shown having base channel members 19 welded thereto. Base channel members 19 carry displaceable shock-absorbing strips 21 therein. Slotted plate straps 22 are bolted via bolts 24 and stud nuts 23 to vertical angle tracks 26. Vertical angle tracks 26 abut displaceable shock-absorbing strips 21 and corners of container 16.

OPERATION

Referring to all of the FIGS., it can be seen that a plurality of containers 16 can be vertically disposed within vertical cells 14 in cargo ship 12. At each corner of containers 16 the mounting consists of: base channel 19, displaceable shock-absorbing strip 21, slotted plate strap 22, and vertical angle track 26. A guide in casting 28 is located at the top corners of the vertical cells together with the entry wedge shown at 29 and vertical angle track 26 dimensioned for cooperation with a guide in casting 28.

It can be seen that with the containers loaded in the cargo container mounting of the present invention, fore and aft movement of the container is absorbed by the displaceable shock-absorbing strips 21 which are preferably fabricated foam rubber. This will alleviate any tendency of the containers to wedge themselves into their mountings making removal difficult, if not at times impossible, as well as preserving their structural integrity.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A cargo container mounting for mounting cargo containers on cargo vessels comprising:
   a plurality of cargo container corner locations;
   a vertical channel disposed at each of said corner locations;
   a resilient non-inflatable shock-absorbing strip disposed in said vertical channel;
   a vertical angle bracket adjustably coupled to said resilient non-inflatable shock-absorbing strip, said vertical angle bracket dimensioned for receiving a corner of a cargo container; and
   a guide member disposed over said vertical channel for top-loading a cargo container therein, the guide member comprising a corner bracket having an inverted V crossection.

* * * * *